United States Patent
Kang (10) Patent No.: US 7,956,670 B2
(45) Date of Patent: Jun. 7, 2011

(54) TEMPERATURE SENSING DEVICE AND ELECTRIC DEVICE INCLUDING THE SAME

(75) Inventor: Yong-Hoon Kang, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 11 days.

(21) Appl. No.: 12/457,088

(22) Filed: Jun. 1, 2009

(65) Prior Publication Data

US 2010/0013543 A1    Jan. 21, 2010

(30) Foreign Application Priority Data

Jul. 18, 2008    (KR) .................. 10-2008-0070088

(51) Int. Cl.
*G01K 7/01* (2006.01)
(52) U.S. Cl. ..................... 327/512; 374/170
(58) Field of Classification Search ............ None
See application file for complete search history.

(56) References Cited

U.S. PATENT DOCUMENTS

| | | | |
|---|---|---|---|
| 6,078,208 A | 6/2000 | Nolan et al. ............ 327/512 |
| 6,359,476 B2* | 3/2002 | Hartman et al. ........ 327/106 |
| 6,814,485 B2* | 11/2004 | Gauthier et al. ........ 374/170 |
| 7,413,342 B2* | 8/2008 | Mukherjee ............. 374/170 |
| 2009/0129438 A1* | 5/2009 | Pan ...................... 374/170 |

FOREIGN PATENT DOCUMENTS

| | | |
|---|---|---|
| JP | 7-296582 | 11/1995 |
| KR | 10-0677742 | 1/2007 |
| KR | 10-2007-0066109 | 6/2007 |

* cited by examiner

*Primary Examiner* — Lincoln Donovan
*Assistant Examiner* — Terry L Englund
(74) *Attorney, Agent, or Firm* — Harness, Dickey & Pierce, P.L.C.

(57) ABSTRACT

A temperature sensing device includes a current generator to generate a variable current that varies based on temperature, a charge circuit to accumulate charges based on the variable current, and a count logic circuit to generate a count value synchronized to a clock, and to output the count value as temperature data based on a charged voltage of the charge circuit and a reference voltage.

18 Claims, 7 Drawing Sheets

TEMPERATURE SENSING DEVICE AND ELECTRIC DEVICE INCLUDING THE SAME

PRIORITY STATEMENT

This U.S. non-provisional patent application claims priority under 35 U.S.C. §119 to Korean Patent Application No. 10-2008-0070088 filed on Jul. 18, 2008, in the Korean Intellectual Property Office (KIPO), the entire contents of which is incorporated herein by reference.

BACKGROUND

1. Field

Example embodiments relate to electronic apparatuses and more particularly, to a temperature sensing device.

2. Description of the Related Art

Electronic systems generally include many kinds and pluralities of semiconductor chips. Improved circuit area utilization and power consumption results from electronic systems replacing their components with semiconductor chips. Further, integration density of semiconductor chip is gradually increasing as semiconductor processing technology advances. Nano-dimensional technology is being adopted in fabrication semiconductor memories.

As integration density of semiconductor chips increases chip heat generation becomes important as it affects temperature in an electronic system. In general, if circuit temperature is elevated, it is easy to degrade or cause malfunctions in semiconductor chips. In addition an increase in temperature results in semiconductor chip stress.

An elevation of circuit temperature, causes an electronic system to control a cooling system or adjust an operating rate to prevent the temperature from rising over a predetermined level. Electronic systems may be equipped with a temperature sensing device for sensing temperature

SUMMARY

Example embodiments are directed to a temperature sensing device occupying a relatively small area, to a temperature sensing device set by one-time temperature measurement and to a digitally set temperature sensing device.

According to an example embodiment a temperature sensing device including: a current generator configured to generate a variable current based on a sensed temperature; a charge circuit configured to accumulate charges based on the variable current; and a count logic circuit configured to generate a count value synchronized to a clock, and to output the count value as temperature data based on a charged voltage of the charge circuit and a reference voltage.

According to an example embodiment, the count logic circuit is configured to compare the charge voltage to the reference voltage, and to output the temperature data if the charged voltage reaches the reference voltage.

According to an example embodiment, the current generator includes a diode, and generates the variable current based on an amount of current flowing through the diode.

According to an example embodiment, the current generator generates the variable current proportional to the sensed temperature.

According to an example embodiment, the current generator includes: a current mirror configured to provide the variable current via first and second terminals; a diode electrically connected between the first terminal of the current mirror and a ground terminal; a resistance circuit electrically connected to the second terminal of the current mirror; and a plurality of diodes connected to the resistance circuit and the ground terminal. The resistance circuit is a switched capacitor operating in response to the clock and an inverse signal of the clock. The quantity of the plurality of diodes connected to the resistance circuit is m-times (m is a natural number) of the number of the diode connected to the first terminal.

According to an example embodiment, the charge circuit includes a capacitor charged by the variable current in response to an enabling signal and reset in response to an inverse signal of the enabling signal.

According to an example embodiment, the count logic circuit includes a counter configured to activate with the charge circuit, and to generate the count value synchronized to the clock; a comparator configured to generate a control signal if the variable current is equal to the reference voltage; and a latch configured to store the count value, in response to the control signal, and to output the count value as the temperature data.

According to an example embodiment, a multiplication of the sensed temperature and the temperature data is constant if the reference voltage is regular.

According to an example embodiment, a multiplication of the sensed temperature and the temperature data is varies with the reference voltage.

According to an example embodiment an electronic system includes a temperature sensing device configured to detect a temperature; and a processor configured to control the electronic based on a sensed temperature detected by the temperature sensing device. The temperature sensing device includes a current generator configured to generate a variable current that varies by a sensed temperature; a charge circuit configured to accumulate charges based on the variable current; and a count logic circuit configured to generate a count value synchronized to a clock, and to output the count value as temperature data based on a charged voltage of the charge circuit and a reference voltage.

According to an example embodiment, a multiplication of the sensed temperature and the temperature data is constant if the reference voltage is regular. The processor stores a multiplication of calibrated temperature and temperature data of the calibrated temperature as a reference value. The processor determines the temperature based on the temperature data and the reference value.

According to an example embodiment, a multiplication of the sensed temperature and the temperature data varies with the reference voltage. The processor stores reference values used for compensating variations of the reference voltage, based on multiplications of calibrated temperature and temperature data of the calibrated temperature. The processor determines the sensed temperature based on the temperature data, the temperature data corresponding to the reference values.

According to an example embodiment, the temperature sensing device and the processor are integrated on a single semiconductor device.

According to an example embodiment, the processor communicates with an external host.

According to an example embodiment, the temperature sensing device may occupy a smaller area. Thus, the device may reduce an area of the electronic system including the temperature sensing device.

According to an example embodiment, setting the temperature sensing device by one-time temperature calibration is possible, therefore shortening a setting time for the temperature sensing device and the electronic system including the device.

According to an example embodiment, the temperature sensing device is set in a digital mode. Therefore, shortening a setting time for the temperature sensing device and the electronic system including the device, improving a yield of production.

A further understanding of the nature and advantages of the present invention herein may be realized by reference to the remaining portions of the specification and the attached drawings.

BRIEF DESCRIPTION OF THE DRAWINGS

Example embodiments will be more clearly understood from the following brief description taken in conjunction with the accompanying drawings. FIGS. 1-8 represent non-limiting, example embodiments as described herein.:

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF EXAMPLE EMBODIMENTS

Example embodiments will now be described more fully with reference to the accompanying drawings, in which example embodiments are shown. Example embodiments may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Like numbers indicate like elements throughout. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle may have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

A temperature sensing device may be composed of a temperature sensor detecting temperature and outputting an analog signal, and an analog-digital converter digitizing the analog signal of the temperature sensor. The analog-digital converter may include pluralities of analog circuits.

Normally the analog circuits operate not in accordance to their designed characteristics. Thus, the analog-digital converter may go through a complex process of calibration after fabrication. The analog circuits may be more susceptible to noise than digital circuits. Therefore, a complex process for designing the analog-digital converter must be done to minimize the effect of noise.

Analog circuits are more sensitive to a fabrication process defects than digital circuits. If there is a defect from the fabrication process, the analog-digital converter may not operate normally. Therefore analog-digital converters are lower in yield than other digital circuits. The disadvantage of analog-digital converters is that they occupy a larger area than digital circuits, when forming a single chip with other digital circuits.

To resolve such a problem, the temperature sensing device, according to example embodiments, outputs a digital value from temperature data without an analog-digital converter. The temperature sensing device, according to an example embodiment, includes a current generator for generating a variable current with regard to temperature (hereinafter, referred to as 'temperature current') a charge circuit for accumulating charges by means of the temperature current, and a count logic circuit for generating a count value in sync with a clock signal, comparing a charged voltage of the charge circuit with a reference voltage, and outputting the count value as temperature data in accordance with a result of the comparison.

Hereinafter, preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Like reference numerals refer to like elements throughout the accompanying figures.

Figure 1:
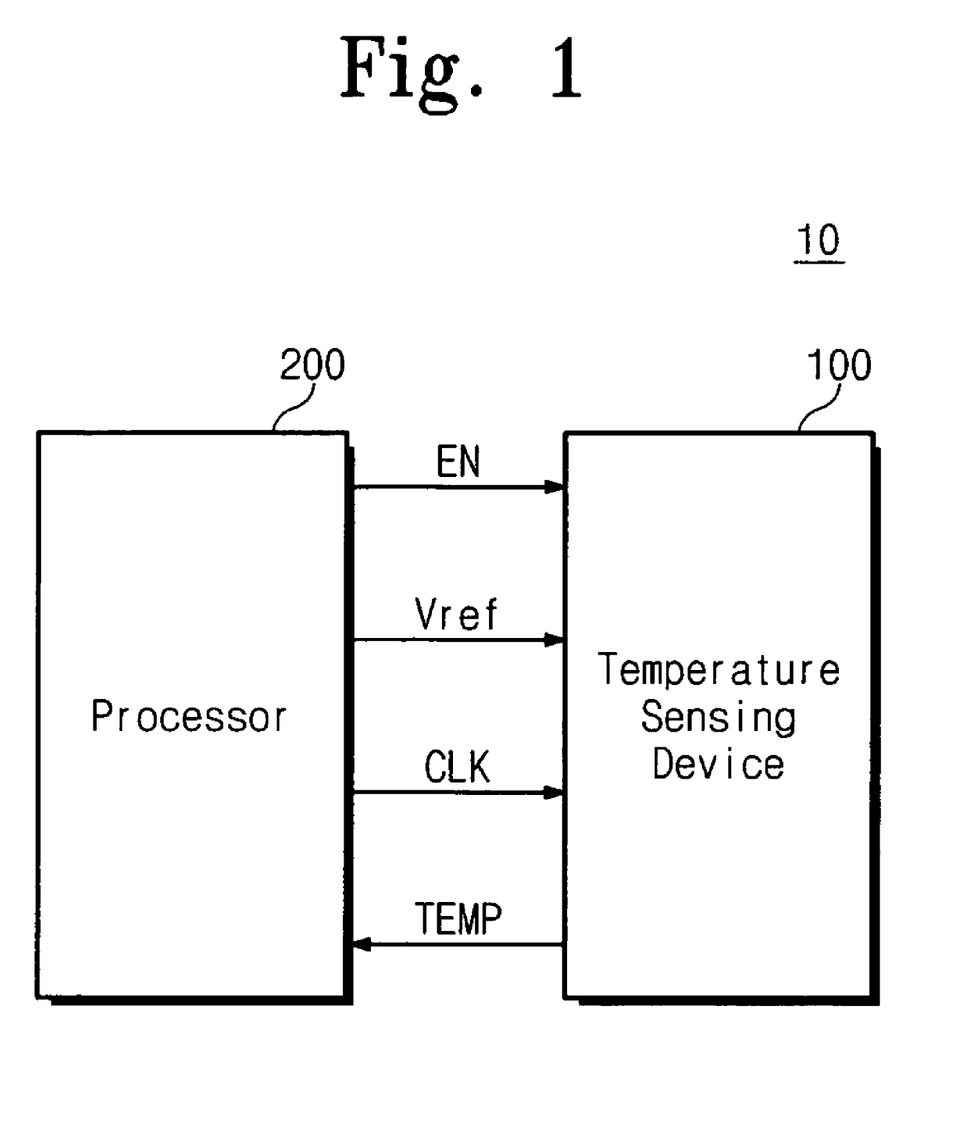
FIG. 1 is a block diagram of an electronic system according to an example embodiment.

FIG. 1 is a block diagram of an electronic system 10 according to an example embodiment. Referring to FIG. 1, the electronic system 10 includes a temperature sensing device 100 and a processor 200.

The temperature sensing device 100 receives an enabling signal EN, a reference voltage Vref, and a clock CLK from the processor 200. The temperature sensing device 100 generates a temperature current that corresponds to temperature variation. Responding to the enabling signal EN, the temperature sensing device 100 begins to count and activate a charge circuit with the temperature current. The temperature sensing device 100 compares a charged voltage of the charge circuit with the reference voltage Vref and outputs temperature data TEMP in accordance with a result of the comparison. For example, when a charged voltage of the charge circuit reaches the reference voltage Vref, the temperature sensing device 100 outputs the temperature data TEMP. The temperature data TEMP is transferred to a processor 200. Internal components and operations of the temperature sensing device 100 will be describer in more detail below.

The processor 200 provides the enabling signal EN, the reference voltage Vref, and the clock CLK to the temperature sensing device 100, and receives the temperature data TEMP from the temperature sensing device 100. The processor 200 reads current temperature by means of the temperature data TEMP and conducts an operation corresponding to the current temperature. If current temperature is higher than a set temperature value, the processor 200 activates a cooling system (not shown) to lower the current temperature of the electronic system 10. Otherwise, the processor 200 is able to cool down the electronic system 10 by lowering its operation rate.

The temperature sensing device 100 and the processor 200 may be in an electronic system 10 such a computer, portable multimedia player (PMP), mobile phone, ultra-mobile personal computer (UMPC), or personal digital assistant (PDA). The temperature sensing device 100 and the processor 200 may also be in a memory card type of the electronic system 10, such as PC card (e.g., PCMCIA), compact flash card (CF), smart media card (SM/SMC), memory stick, multimedia card (e.g., MMC, RS-MMC, or MMCmicro), SD card (e.g., SD, miniSD, or microSD), or universal flash storage (UFS). In this application, the processor 200 may communicate with an external host. In addition, the temperature sensing device 100 and the processor 200 may be in a solid state disk/drive (SSD) as the electronic system 10. Further, the temperature sensing device 100 and the processor 200 may be in a memory system as the electronic system 10.

If the temperature sensing device 100 and the processor 200 is in a electronic system 10 such an SSD or memory system, the electronic system 10 may further include a memory (not shown) for storing data. For example, the electronic device 10 may include one or more memories among volatile memories such as static random access memory (SRAM), dynamic RAM (DRAM), and synchronous DRAM, and nonvolatile memories such as read-only memory (ROM), magnetic ROM, phase-changeable RAM, and ferro-electric RAM.

The temperature sensing device 100 and the processor 200 may be integrated in a single semiconductor chip, forming the electronic system 10. For example, the electronic system 10 may be in a system-on-chip and chip-on-board.

The processor 200 may be a generic processor or a specified processor for controlling the temperature sensing device 100. The temperature sensing device 100 and the processor 200 may be integrated in a single semiconductor chip, forming a temperature sensing system. This temperature sensing system may be the electronic system 10 operating to detect temperature variation and output digital data as information about temperature.

Figure 2:
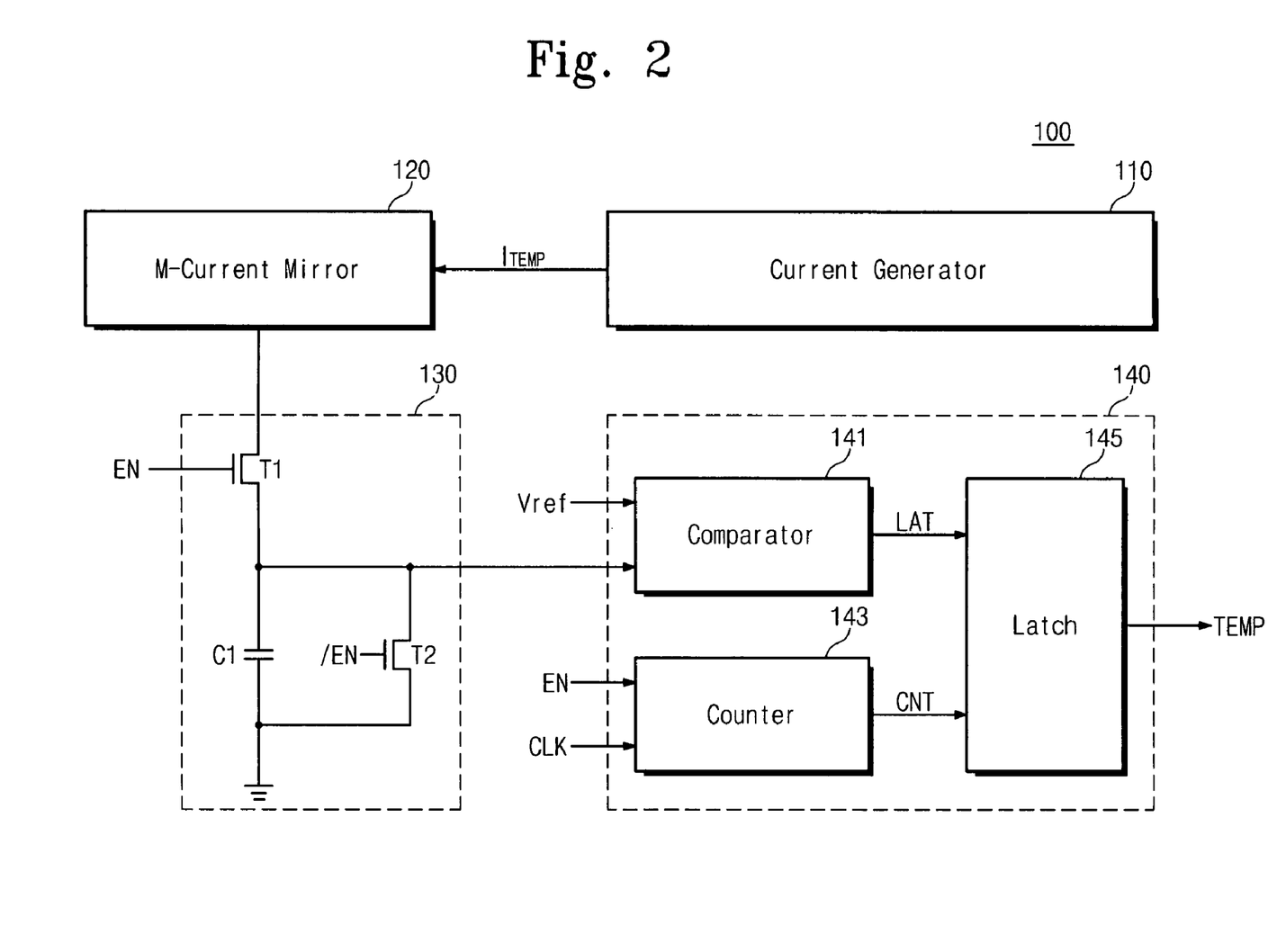
FIG. 2 is a block diagram of the temperature sensing device shown in FIG. 1.

FIG. 2 is a block diagram of the temperature sensing device 100 shown in FIG. 1. Referring to FIG. 2, the temperature sensing device 100 according to an example embodiment includes a current generator 110, a current mirror 120, a charge circuit 130, and a count logic circuit 140.

The current generator 110 functions to generate a current (i.e., temperature current; $I_{TEMP}$) that varies with temperature fluctuation. The current generator 110 makes the temperature current $I_{TEMP}$ by means of the property that an amount of current flowing through a diode varies by temperature. The temperature current $I_{TEMP}$ may be proportional to temperature. The current generator 110 will be described in more detail in conjunction with FIG. 3.

The current mirror 120 accepts the temperature current $I_{TEMP}$ from the current generator 110 as input and outputs a current to the charge current 130 corresponding with the temperature current $I_{TEMP}$. For example, the current mirror 120 generates and provides a current, which is M times that of the temperature current $I_{TEMP}$, to the charge circuit 130. Here, M may be 1 or an integer greater than 1.

The charge circuit 130 receives a current, corresponding to the temperature current $I_{TEMP}$, from the current mirror 120. For example, if the coefficient M of the current mirror 120 is an integer greater than 1, the charge circuit 130 receives a current of M times the temperature current $I_{TEMP}$. For convenience of description, it is assumed that the temperature current $I_{TEMP}$ is transferred to the charge circuit 130 from the current mirror 120.

The charge circuit 130 includes transistors T1 and T2 and a capacitor C1. The transistor T1 is connected between the current mirror 120 and the capacitor C1. The capacitor C1 is coupled between the transistor T1 and the ground terminal. The transistor T2 is coupled to the capacitor C1 in parallel. A voltage of a node between the transistor T1 and the capacitor C1, e.g., a voltage of the capacitor C1 (hereinafter, referred to as 'charged voltage V_C1'), is transferred to the count logic circuit 140.

The transistor T1 operates in response to the enabling signal EN. The transistor T2 operates in response to an inverse signal /EN of the enabling signal EN. If the enabling signal EN is activated, the transistor T1 is turned on while the transistor T2 is turned off. The capacitor C1 is charged up by the temperature current $I_{TEMP}$. If the enabling signal EN is inactivated, the transistor T1 is turned off while the transistor T2 is turned on, and the capacitor C1 is reset to the ground voltage.

The count logic circuit 140 receives the charged voltage V_C1 from the charge circuit 130 as input. The count logic circuit 140 receives the reference voltage Vref, the enabling signal EN, and the clock CLK from the charge circuit 130 as inputs. The count logic circuit 140 generates a count value in sync with the clock CLK, compares the charged voltage V_C1 of the charge circuit 130 to the reference voltage Vref, and outputs the count value as the temperature data TEMP according to the result of the comparison. If the charged voltage V_C1 reaches the reference voltage Vref, the count logic circuit 140 outputs the temperature data TEMP. The temperature data TEMP is transferred to the processor 200.

The count logic circuit 140 includes a comparator 141, a counter 143, and a latch 145. The comparator 141 compares the charged voltage V_C1 with the reference voltage Vref, and transfers a result of the comparison to the latch 145 as a control signal LAT. If the charge voltage V_C1 reaches the reference voltage Vref, the comparator 141 activates the control signal LAT.

The counter 143 receives the enabling signal EN and the clock CLK as inputs. The counter 143 generates a count value in sync with the clock CLK. The count value CNT is transferred to the latch 145. The counter 143 is activated in sync with the enabling signal EN. For example, the counter 143 is activated together with the charge circuit 130.

The latch 145 receives the control signal LAT from the comparator 141 and accepts the count value CNT from the counter 143 as inputs. If the control signal LAT is activated, the latch 145 stores the count value CNT that is transferred from the counter 141, and outputs the count value CNT as the temperature data TEMP. The temperature data TEMP represents a count value (i.e., time) until the charged voltage V_C1 of the charge circuit 130, which is set by the temperature current $I_{TEMP}$, reaches the reference voltage. In other words, the temperature data TEMP represents a dimension of the temperature current $I_{TEMP}$, so it is able to sense current temperature by means of the temperature data TEMP.

Figure 3:
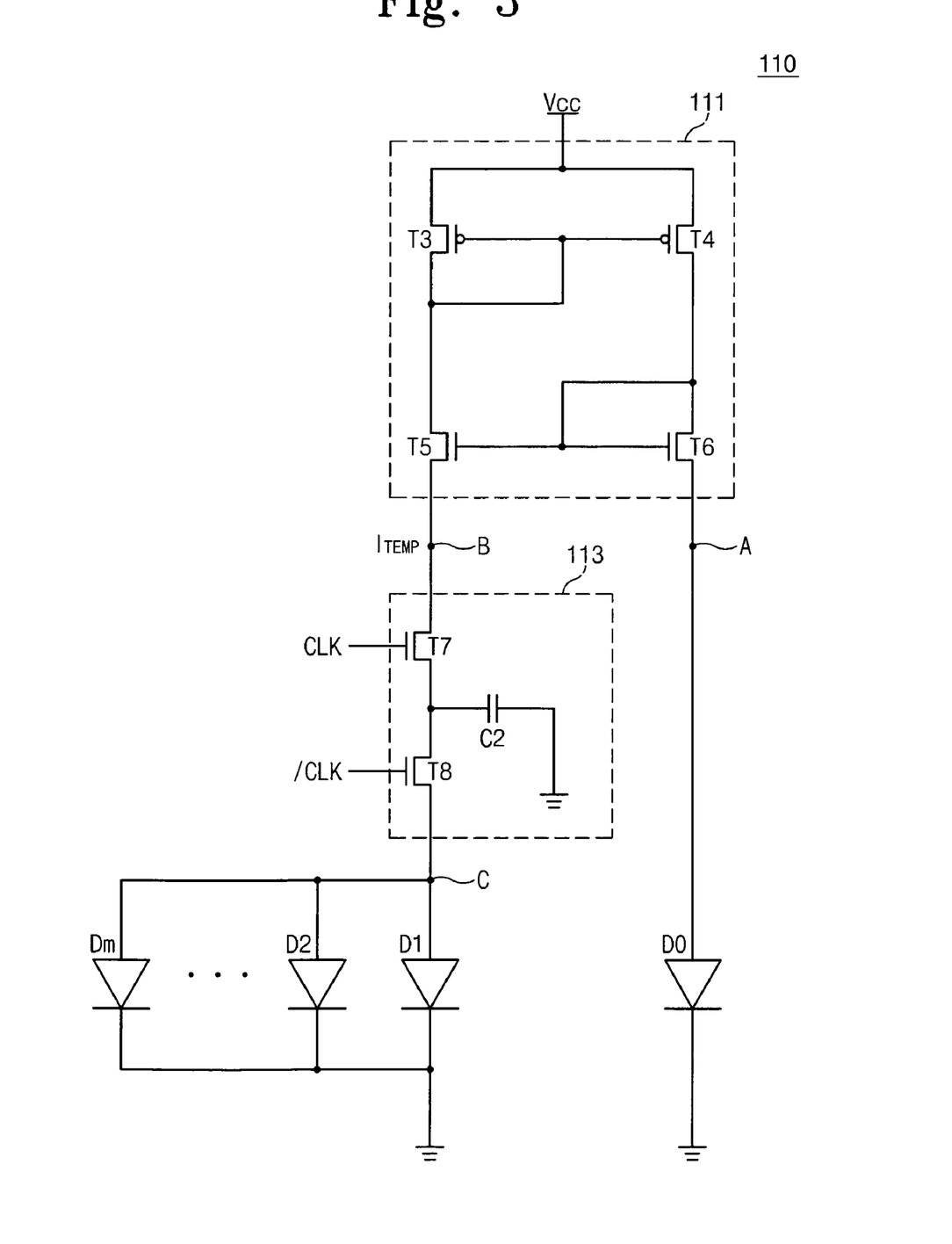
FIG. 3 is a circuit diagram of the current generator shown in FIG. 2.

FIG. 3 is a circuit diagram of the current generator 110 shown in FIG. 2. Referring to FIG. 3, the current generator 110 includes a current mirror 111, a resistance circuit 113, and diodes D0~Dm. The current mirror 111 regulates currents, which are supplied into nodes A and B. The current mirror 111 may be a Wilson current mirror TEMP as shown in FIG. 3. The current mirror 111 may include P-type transistors T3 and T4 and N-type transistors T5 and T6.

The resistance circuit 113 may be connected to node B. The resistor circuit 113 may include transistors T7 and T8 and a capacitor C2. Transistors T7 and T8 may be serially connected to node B. The capacitor C2 may be connected between the ground terminal and a node between the transistors T7 and T8. The transistor T7 may operate in response to the clock CLK, while the transistor T8 may operate in response to an inverse signal /CLK of the clock CLK. The transistors T7 and T8 and the capacitor C2 constitute a switched capacitor circuit. Therefore, a resistance value of the resistance circuit 113 is dependent on a ratio of a cycle period $T_{CLK}$ of the clock CLK and a capacitance value of the capacitor C2. For example, the resistance value of the resistance circuit 113 is defined in Equation 1 as follows.

$$R = \frac{T_{CLK}}{C2} \qquad \text{[Equation 1]}$$

Diodes D1~Dm may be connected between the resistance circuit 113 and the ground terminal. Diodes D1~Dm may be connected between the resistance circuit 113 and the ground terminal in parallel, and node A is connected to diode D0.

The current generator 110 generates the temperature current $I_{TEMP}$ by utilizing the characteristic that an amount of current flowing through the diode varies according to temperature. The current generator 110 outputs the temperature current $I_{TEMP}$ because it is proportional to temperature. The current generator 110 provides the temperature current $I_{TEMP}$ to the nodes A and B. The operation of the current generator 110 will be described in more detail with reference to mathematical formulas.

The voltage-current characteristic of diode is given by $$i = I_S(e^{v/V_T}) \qquad \text{[Equation 2]}$$

Where, i is a current flowing through the diode and $I_S$ is a constant temperature. The parameter v is a voltage applied to both ends of the diode and the parameter $V_T$ is a threshold voltage of the diode.

The threshold voltage $V_T$ of the diode is defined in Equation 3.

$$V_T = \frac{kT}{q} \qquad \text{[Equation 3]}$$

Where, k is the Boltzmann constant (e.g., $1.38 \times 10^{-23}$ J/K) and q is a unit amount of charges (e.g., $1.60 \times 10^{-19}$ C). The parameter T denotes temperature (i.e., the absolute temperature).

The current mirror 111 provides currents through the nodes A and B. In other words, a current flowing through diode D0 from node A is equal to the current flowing through the diodes D1~Dm from the node C, which is the temperature current $I_{TEMP}$. Therefore, referring to Equations 2 and 3, the temperature current is summarized into Equation 4.

$$I_{TEMP} = I_S e^{V_A/V_T} = mI_S e^{V_C/V_T} \qquad \text{[Equation 4]}$$

Where, $V_A$ is the voltage of node A and $V_C$ is the voltage of the node C. The parameter m denotes the number of the diodes D1~Dm connected to node C.

From Equation 4, the voltages $V_A$ and $V_C$ are represented as a function of the temperature current $I_{TEMP}$. The voltages $V_A$ and $V_C$ are defined as follows.

$$V_A = V_T \ln(I_{TEMP}/I_S)$$

$$V_C = V_T [\ln(I_{TEMP}/I_S) - \ln(m)] \qquad \text{[Equation 5]}$$

A voltage applied to both ends of the resistance circuit 113 is determined by a resistance value of the resistance circuit 113 and an amount of current flowing through the resistance circuit 113. A voltage of node A is equal to node B. In other words, a voltage gap between the nodes B and C is homogeneous with a voltage gap between the nodes A and C. From Equations 1, 3, and 5, the temperature current $I_{TEMP}$ results in $$I_{TEMP} = \frac{V_A - V_C}{R} \qquad \text{[Equation 6]}$$
$$= \frac{V_T \cdot \ln(m)}{R}$$
$$= \frac{k \cdot T}{q} \cdot \frac{\ln(m)}{R}$$
$$= \frac{k \cdot T \cdot \ln(m)}{q} \cdot \frac{C2}{T_{CLK}}$$

Where, k, q, m, and C2 are constants. Thus, the temperature current $I_{TEMP}$ is proportional to the temperature T and inversely proportional to the period $T_{CLK}$. The current generator 110 makes the temperature current $I_{TEMP}$ that varies on the temperature T in the characteristic that an amount of current flowing through the diodes D0~Dm varies with the temperature T. The current generator 110 outputs the temperature current $I_{TEMP}$ that is proportional to the temperature T.

As illustrated in FIG. 2, the temperature current $I_{TEMP}$ is provided to the charge circuit 130 from the current generator 110. If the enabling signal EN is activated, the temperature current $I_{TEMP}$ charges the capacitor C1 of the charge circuit 130. If the charged voltage V_C1 reaches the reference voltage Vref, the count logic circuit 140 outputs a count value, which is synchronized to the clock CLK, as the temperature data TEMP.

Current is defined by a charge amount per hour (I=Q/t). Charge amount accumulated in a capacitor is defined by a multiplication of capacitance and voltage (Q=CV). Combining the current formula I=Q/t with the charge amount formula Q=CV, deriving an equation of time for which a voltage of the capacitor reaches a target voltage when a current is supplied into the capacitor. The time for which a voltage of the capacitor reaches a target voltage is set on a value that is obtained from dividing capacitance C and the target voltage V by current I (t=CV/I).

Defining that parasitic capacitance of the charge circuit 130 is Cp and assuming that the target voltage V is the reference voltage Vref and current I is the temperature current $I_{TEMP}$, obtaining a sensing time ST, (C2+Cp)Vref/$I_{TEMP}$, for which the charged voltage V_C1 reaches the reference voltage Vref. Referring to Equation 6, the sensing time ST is defined in Equation 7 as follows.

$$ST = \frac{q \cdot (C1 + Cp) \cdot Vref}{C2 \cdot k \cdot \ln(m)} \cdot \frac{T_{CLK}}{T} \qquad \text{[Equation 7]}$$

Responding to the enabling signal EN, the charge circuit 130 begins charging and the count logic circuit 140 begins its counting operation. If the charged voltage V_C1 reaches the reference voltage Vref, the count value CNT is output as the temperature data TEMP. The count logic circuit 140 conducts the counting operation in sync with the clock CLK. The temperature data TEMP represents the count value CNT until the charged voltage V_C1 reaches the reference voltage Vref. Thus, the temperature data TEMP is defined by (TEMP=ST/$T_{CLK}$) that is obtained by dividing the sensing time ST by the period $T_{CLK}$ of the clock CLK. Referring to the temperature data TEMP=ST/$T_{CLK}$ and Equation 7, the multiplication of the temperature data TEMP and the temperature T can be summarized in Equation 8 as follows.

$$TEMP \cdot T = \frac{ST}{T_{CLK}} \cdot T = \frac{q \cdot (C1 + Cp) \cdot Vref}{k \cdot \ln(m) \cdot C2} \qquad \text{[Equation 8]}$$

Where, q, k, m, C1, Cp, and C2 are constants, while Vref is the reference voltage. If the reference voltage Vref provided from the processor 200 is maintained constant, the multiplication of the temperature data TEMP and the temperature T becomes a constant. And, if the reference voltage Vref changes, the multiplication of the temperature data TEMP and the temperature T varies along the reference voltage Vref.

The electronic system 10 according an example embodiment stores temperature T' and temperature data TEMP' of the temperature T' as a reference value REF. the temperature T' is calibrated in the electronic system 10 after fabricating the electronic system 10. And, the temperature data TEMP' is obtained from the temperature sensing device 100. The electronic system 10 stores temperature T' and temperature data TEMP' of the temperature T' as the reference value REF.

The temperature is detected by means of the temperature data TEMP provided from the temperature sensing device 200 and the reference value REF. If the reference voltage Vref is maintained on a constant level, the multiplication of temperature T and the temperature data TEMP is a constant and identical to the reference value REF. For example, the temperature T is calculated by dividing the reference value REF by the temperature data TEMP (T=REF/TEMP). This operation will be described in more detail in conjunction with FIG. 4.

If the reference voltage Vref fluctuates, the multiplication of the temperature T and the temperature data TEMP is dependent on a variation of the reference voltage Vref. The electronic system 10 stores the multiplication of the temperature T' and the temperature data TEMP', and the reference value REF is set to compensate for variation of the reference voltage Vref. As a result, the temperature T can be defined as a value obtained from dividing the reference value REF by the temperature data TEMP. This operation will be described in more detail with reference to FIGS. 5 and 6.

The resistance circuit 113 of the current generator 110, according to an example embodiment, is formed by including a switched capacitor that operates in sync with the clock CLK. Equation 8 shows, the temperature data TEMP is obtained from dividing the sensing time ST by the period $T_{CLK}$ of the clock CLK. As the resistance value of the resistance circuit 113 is proportional to the period $T_{CLK}$ of the clock CLK, the temperature data TEMP is defined by Equation 8 as independent from the period $T_{CLK}$ of the clock CLK. The reference value REF is defined as independent from the period $T_{CLK}$ of the clock CLK because the temperature sensing device 100 according to the example embodiment and the electronic system 10 are dependent on the period $T_{CLK}$ of the clock CLK.

Figure 4:
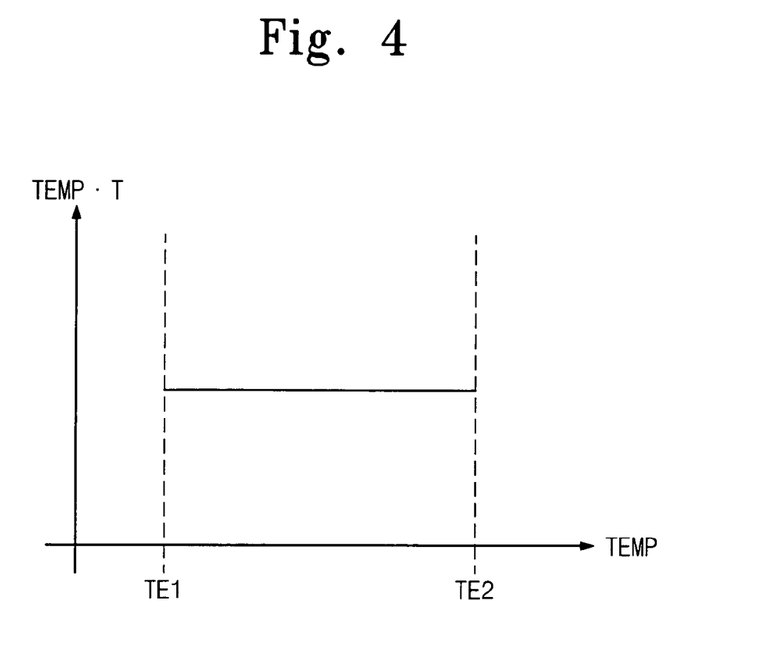
FIG. 4 is a graphic diagram showing an example embodiment for arranging a reference value by the electronic system shown in FIG. 1.

FIG. 4 is a graphic diagram showing an example embodiment for arranging the reference value REF by the electronic system 10 shown in FIG. 1. In FIG. 4, the horizontal axis denotes the temperature data TEMP and the vertical axis denotes the multiplication of the temperature data TEMP and the temperature T. The temperature data TEMP represents the count value CNT until the charged voltage V_C1 of the charge circuit 130, which is charged by the temperature current $I_{TEMP}$, reaches the reference voltage Vref. If the temperature data TEMP is relatively high, a time for which the charged voltage V_C1 reaches the reference voltage Vref is relatively long. As an amount of temperature current $I_{TEMP}$ is relatively small, the temperature T is relatively low.

Referring to FIG. 4, multiplications of the temperature data TEMP and the temperature T are equal between first and second points TE1 and TE2. The graph of FIG. 4 depicts an example where there is no variation of the reference voltage Vref. The reference value is determined by measuring the temperature T' and receiving the temperature data TEMP' from the temperature sensing device 100. The electronic system 10 senses temperature from dividing the reference value REF by the temperature data TEMP provided from the temperature sensing device 100. The one-time calibration makes it possible to provide the temperature sensing function for the temperature sensing device 100 and the electronic system 10 including the temperature sensing device 100. Therefore, the temperature sensing device 100 and the electronic system including the temperature sensing device 100 may be advantageous to shortening their production periods.

Figure 5:
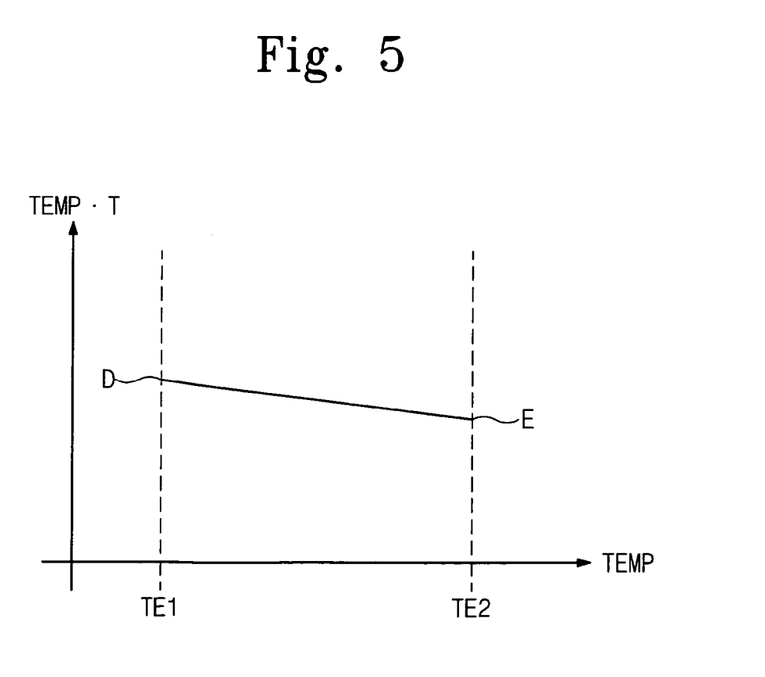
FIG. 5 is a graphic diagram showing an example embodiment for arranging a reference value by the electronic system shown in FIG. 1.

FIG. 5 is a graphic diagram showing an example embodiment for arranging the reference value REF in the electronic system 10 shown in FIG. 1. Referring to FIG. 5, multiplications of the temperature data TEMP and the temperature T may not be equal between the first and second points TE1(D) and TE2(E), resulting in a form of linear function. The multiplication of the temperature data TEMP and the temperature T may decrease as large as the temperature data TEMP. The graph of FIG. 5 shows that the reference voltage Vref varies.

The multiplication of the temperature data TEMP and the temperature T is defined as a linear function. The reference value REF is stored as a linear function according to the temperature data TEMP. By obtaining the multiplications of the temperature data TEMP and the temperature T at the first and second points TE1(D) and TE2(E), the reference value REF may be determined by the temperature data TEMP as a linear function. The electronic system 10 may store the reference values REF for compensating variation of the reference voltage Vref by utilizing the multiplications of calibrated values of the temperature T and plural values of the temperature data TEMP according to the values of the temperature T.

The reference value REF may be a function of the temperature data TEMP. The reference value REF may be determined if the temperature data TEMP is provided from the temperature sensing device 100. In other words, variation of the reference voltage Vref may be compensated for by setting the reference value REF to a function dependent on the temperature data TEMP.

As aforementioned, although the reference voltage Vref varies, the electronic system 10 according to an example embodiment is conditioned to sense temperature by way of two-time calibrations. A production term of the electronic system 10 may be shortened. Further, the operation for compensation of variation in the reference voltage Vref may be carried out in a digital mode with the temperature data TEMP. Reducing a time for compensating variation of the reference voltage Vref and errors during the compensation. Additionally, the operation for setting the reference value REF to compensate variation of the reference voltage Vref may be carried out in a digital mode, effectively reducing an execution time and errors.

Figure 6:
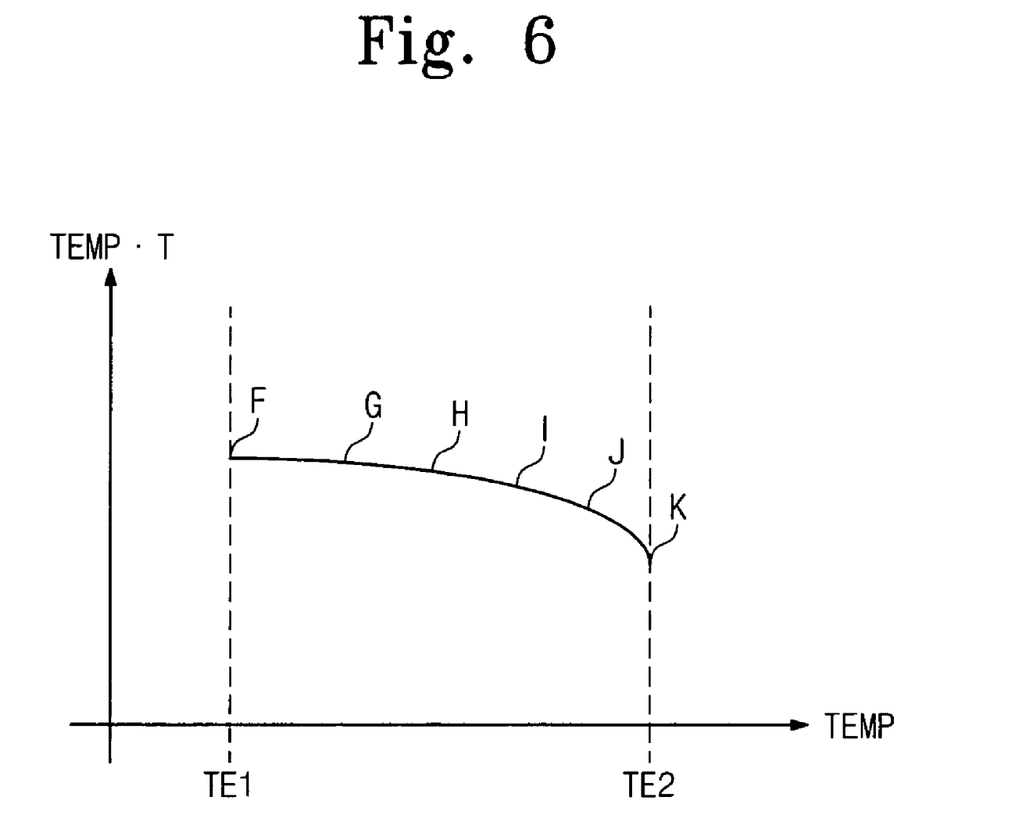
FIG. 6 is a graphic diagram showing an example embodiment for arranging a reference value by the electronic system shown in FIG. 1.

FIG. 6 is a graphic diagram showing an example embodiment for arranging the reference value REF by the electronic system 10 shown in FIG. 1. Referencing FIG. 6, Multiplications of the temperature data TEMP and the temperature T may be arranged in a form of poly-dimensional function with the temperature data TEMP. For example, the graph of FIG. 6 depicts the reference voltage Vref varies by the temperature T in a form of poly-dimensional function.

The reference value REF is established in a form of poly-dimensional function according to the temperature data TEMP. By calibrating multiplications of the temperature data TEMP and the temperature T at plural points F, G, H, I, J, and K, arranging the reference value REF in a poly-dimensional function according to the temperature data TEMP is possible. Dividing the interval between the points TE1 and TE2 into plural sections F-G, G-H, H-I, I-J, and J-K, set functions respective to the sections, and arrange an aggregation of the functions corresponding each to the sections on the reference value REF may also be permitted. The functions corresponding each to the sections may be used for determining the reference value REF in accordance with the temperature data TEMP.

The reference value REF may be a function according to the temperature data TEMP. The reference value REF may be determined if the temperature data TEMP is provided from the temperature sensing device 100. The temperature T may be determined from dividing the reference value REF by the temperature data TEMP. For Example, variation of the reference voltage Vref may be compensated by setting the reference value REF on the function dependent on the temperature data TEMP.

As stated above, although the reference voltage Vref fluctuates, the electronic system 10 according to an example embodiment may be conditioned to sense temperature by way of a smaller number of calibrations, relative to a conventional analog-digital converter. Therefore a production period for the electronic system 10 may be shortened. Further, the operation for compensating variation of the reference voltage Vref may be carried out in a digital mode with the temperature data TEMP. Time for compensating variation of the reference voltage Vref and errors during the compensation may be reduced. Additionally, the operation for setting the reference value REF to compensate variation of the reference voltage Vref may be also carried out in a digital mode, effectively reducing an execution time and errors.

Figure 7:
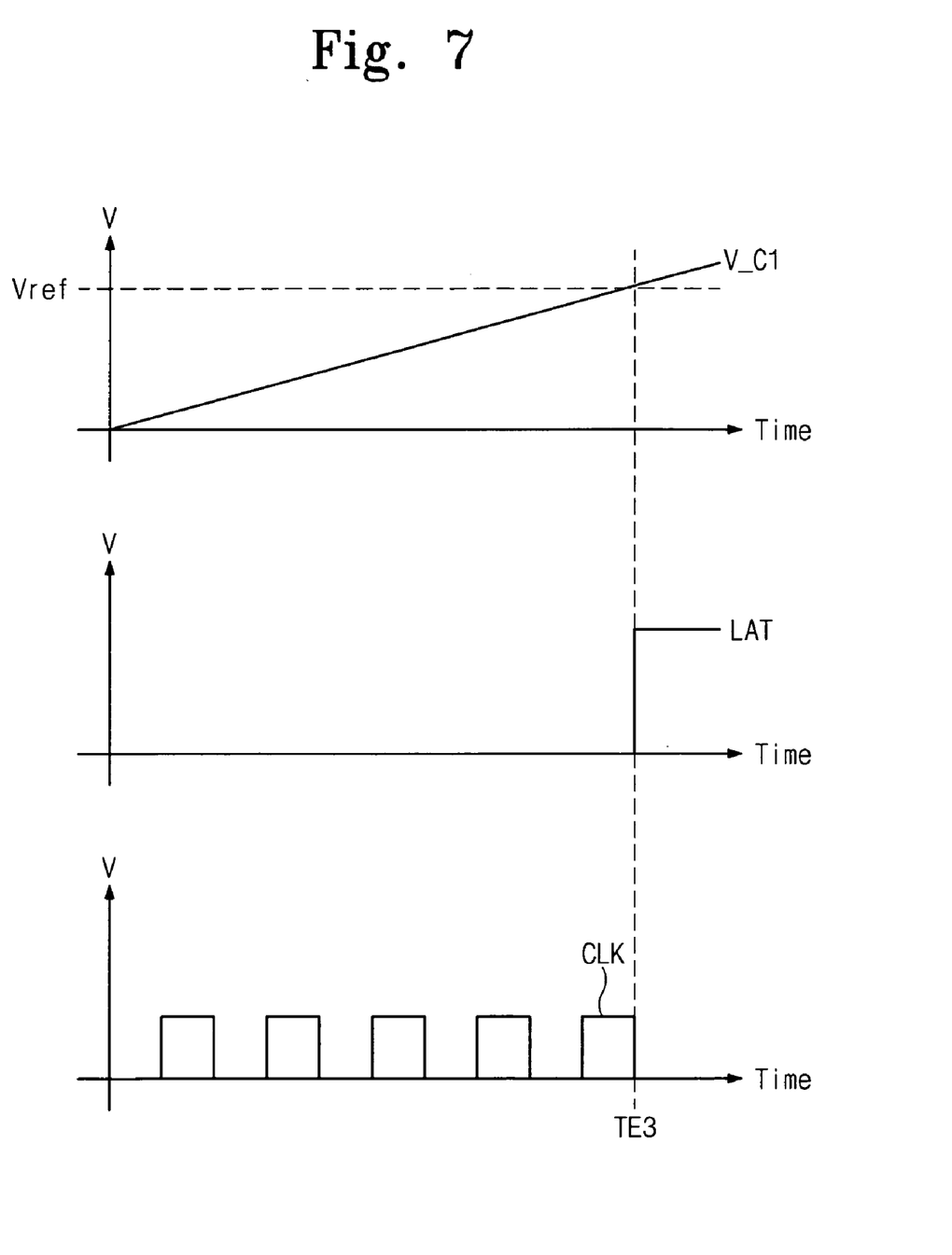
FIGS. 7 and 8 are graphic diagrams showing an example embodiment for operation of the electronic system shown in FIG. 1.
Figure 8:
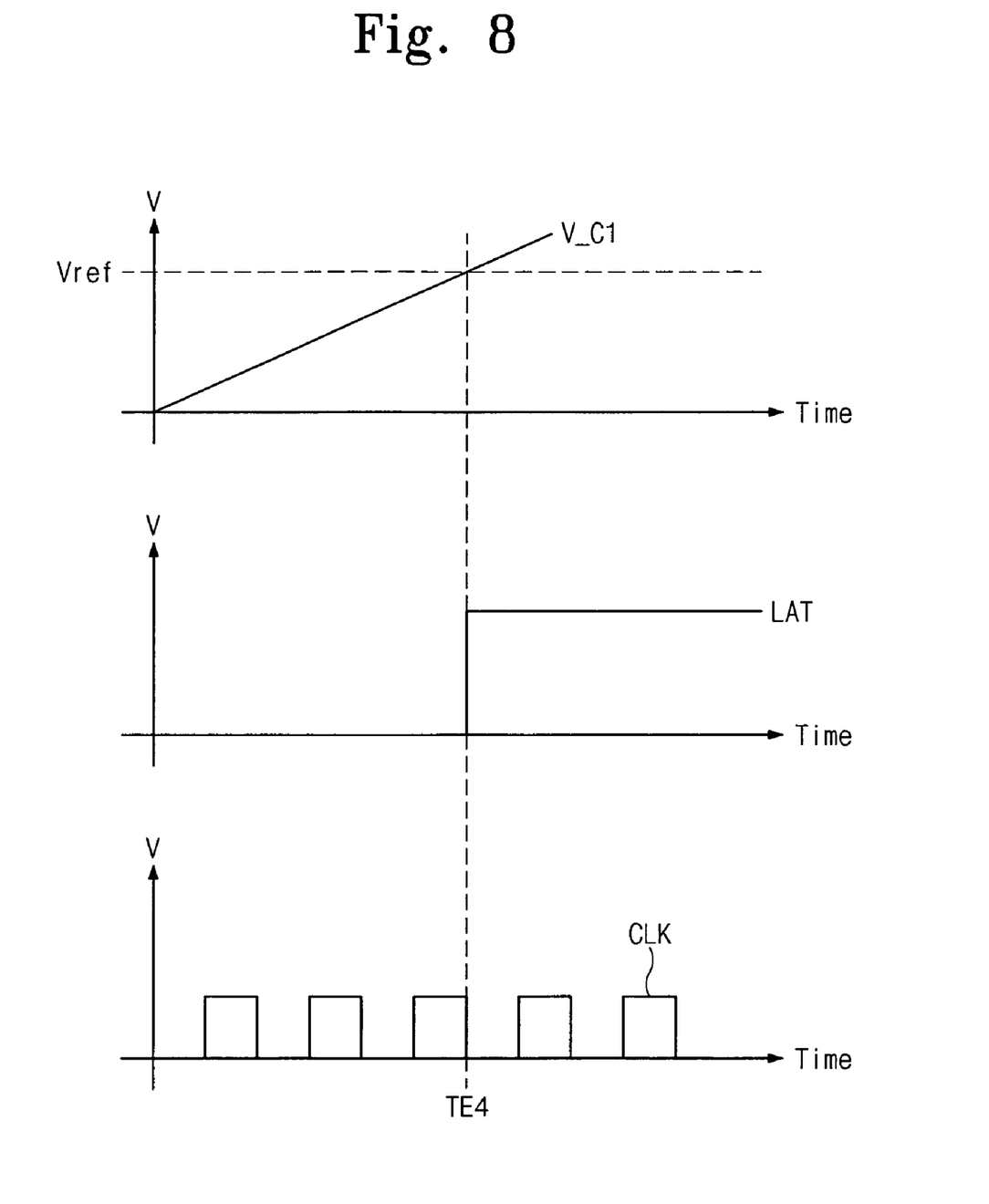

FIGS. 7 and 8 are graphic diagrams showing an example embodiment for operation of the electronic system 10 shown in FIG. 1. As noticed from the first graph of FIG. 7, the charged voltage V_C1 reaches the reference voltage Vref at a point TE3. The control signal LAT is activated at the point TE3 and the latch 145 of FIG. 2 outputs the count value CNT as the temperature data TEMP. The number of counts until the point TE3 is 5.

From the first graph of FIG. 8, the charged voltage V_C1 reaches the reference voltage Vref at a point TE4. The control signal LAT may be activated at the point TE4 and the latch 145 of FIG. 2 outputs the count value CNT as the temperature data TEMP. The number of counts until the point TE4 is 3.

As the count value of FIG. 7 is larger than that of FIG. 8, the temperature is higher in FIG. 7 than FIG. 8. The processor 200 may determine the temperature T through dividing the reference data REF by the temperature data TEMP.

As aforementioned, the temperature sensing device 100 according to an example embodiment and the electronic system including the device 100 may operate to sense and determine the temperature T, without an analog-digital converter, by means of the charge circuit 130 and the count logic circuit 140. Reducing the area of the temperature sensing circuit 100 and the electronic system 10 including the 100 temperature sensing circuit.

As described above, the temperature sensing device 100 according to an example embodiment and the electronic system including the temperature sensing device 100 determine the reference value REF in a digital mode. The temperature sensing device 100 according to an example embodiment and the electronic system including the temperature sensing device 100 may conduct the operation of calibration for sensing temperature in a digital mode, the calibration may be accomplished in a shorter time. Therefore, a production period for the electronic system 10 may be shortened. Further, reducing the number of errors arising from the calibration by the temperature sensing device 100 according to an example embodiment and the electronic system including the temperature sensing device 100 may improve production yield.

Moreover, the temperature sensing device 100 according to an example embodiment and the electronic system including the temperature sensing device 100 may determine the temperature T in a digital mode. Accordingly, enhancing a temperature sensing rate and reducing errors thereof.

While example embodiments have been particularly shown and described, it will be understood by one of ordinary skill in the art that variations in form and detail may be made therein without departing from the spirit and scope of the claims.

What is claimed is:

1. A temperature sensing device comprising:
    a current generator configured to generate a variable current, the variable current varies based on a sensed temperature;
    a charge circuit configured to accumulate charges based on the variable current; and
    a count logic circuit including,
        a counter configured to,
            activate with the charge circuit, and
            generate a count value synchronized to a clock,
        a comparator configured to generate a control signal if an accumulated charge voltage, associated with the variable current, is equal to a reference voltage, and
        a latch configured to,
            store the count value, in response to the control signal, and
            output the count value as temperature data based on the accumulated charge voltage of the charge circuit and the reference voltage.

2. The temperature sensing device of claim 1, wherein the count logic circuit is configured to,
    compare the charge voltage to the reference voltage, and
    output the temperature data if the charg voltage reaches the reference voltage.

3. The temperature sensing device of claim 1, wherein the current generator includes a diode, and generates the variable current based on an amount of current flowing through the diode.

4. The temperature sensing device of claim 1, wherein the current generator generates the variable current proportional to the sensed temperature.

5. The temperature sensing device of claim 1, wherein the current generator comprises:
    a current mirror configured to provide the variable current via first and second terminals;
    a diode electrically connected between the first terminal of the current mirror and a ground terminal;
    a resistance circuit electrically connected to the second terminal of the current mirror; and
    a plurality of diodes connected to the resistance circuit and the ground terminal.

6. The temperature sensing device of claim 5, wherein the resistance circuit is a switched capacitor operating in response to the clock and an inverse signal of the clock.

7. The temperature sensing device of claim 1, wherein the charge circuit comprises:
    a capacitor charged by the variable current in response to an enabling signal and reset in response to an inverse signal of the enabling signal.

8. The temperature sensing device of claim 1, wherein a multiplication of the sensed temperature and the temperature data is a constant if the reference voltage is regular.

9. The temperature sensing device of claim 1, wherein a multiplication of the sensed temperature and the temperature data varies with the reference voltage.

10. An electronic system comprising:
    a temperature sensing device configured to detect a temperature, the temperature sensing device including,
        a current generator configured to generate a variable current, the variable current varies by a sensed temperature,
        a charge circuit configured to accumulate charges based on the variable current, and
        a count logic circuit including,
            a counter configured to,
                activate with the charge circuit, and
                generate a count value synchronized to a clock,
            a comparator configured to generate a control signal if an accumulated charge voltage, associated with the variable current, is equal to a reference voltage, and
            a latch configured to, P4 store the count value, in response to the control signal, and
                output the count value as temperature data based on the accumulated charge voltage of the charge circuit and the reference voltage; and
    a processor configured to control the electronic system based on the sensed temperature.

11. The electronic system of claim 10, wherein a multiplication of the sensed temperature and the temperature data is a constant if the reference voltage is regular.

12. The electronic system of claim 11, wherein the processor stores a multiplication of a calibrated temperature and temperature data of the calibrated temperature as a reference value.

13. The electronic system of claim 12, wherein the processor determines the temperature based on the temperature data and the reference value.

14. The electronic system of claim 10, wherein a multiplication of the sensed temperature and the temperature data varies with the reference voltage.

15. The electronic system of claim 14, wherein the processor stores reference values used for compensating variations of the reference voltage, based on multiplications of a calibrated temperature and temperature data of the calibrated temperature.

16. The electronic system of claim 15, wherein the processor determines the sensed temperature based on the temperature data, the temperature data corresponding to the reference values.

17. The electronic system of claim 10, wherein the temperature sensing device and the processor are integrated in a single semiconductor device.

18. The electronic system of claim 10, wherein the processor communicates with an external host.

* * * * *